United States Patent [19]
Frutschi et al.

[11] Patent Number: 5,313,782
[45] Date of Patent: May 24, 1994

[54] COMBINED GAS/STEAM POWER STATION PLANT

[75] Inventors: Hans U. Frutschi, Riniken; Alfred Häusermann, Rieden; Hans Wettstein, Fislisbach, all of Switzerland

[73] Assignee: Asea Brown Boveri Ltd., Baden, Switzerland

[21] Appl. No.: 127,444

[22] Filed: Sep. 10, 1993

Related U.S. Application Data

[63] Continuation of Ser. No. 889,352, May 28, 1992, abandoned.

[30] Foreign Application Priority Data

Jun. 1, 1991 [DE] Fed. Rep. of Germany ....... 4118062

[51] Int. Cl.$^5$ ................................. F02C 6/18
[52] U.S. Cl. ................. 60/39.17; 60/39.182; 60/728
[58] Field of Search ............... 60/39.04, 39.17, 39.181, 60/39.182, 728

[56] References Cited

U.S. PATENT DOCUMENTS

| | | | |
|---|---|---|---|
| 3,289,402 | 12/1966 | Jung et al. | ............ 60/39.182 |
| 4,550,562 | 11/1985 | Rice . | |
| 4,893,466 | 1/1990 | Egnell et al. | ............ 60/39.182 |
| 4,896,499 | 1/1990 | Rice . | |

FOREIGN PATENT DOCUMENTS

3343319A1  6/1985  Fed. Rep. of Germany .
3815993A1 11/1989  Fed. Rep. of Germany .

*Primary Examiner*—Louis J. Casaregola
*Attorney, Agent, or Firm*—Burns, Doane, Swecker & Mathis

[57] ABSTRACT

In a combined gas/steam power station plant which consists essentially of a fossil-fired gas turbine group and a steam circuit, with an exhaust heat boiler (11) in between, intercooling and reheat are provided to maximize the efficiency. The gas turbine group consists of two compressors (1, 2), of two combustion chambers (7, 9) and of two turbines (8, 10). Downstream of the first compressor (1), there is an intercooler (3) and on the cool side of this is placed an evaporator (4) which is in effective connection with the intercooler. The steam quantity formed in the evaporator (4) is introduced into a turbine (6) of the steam circuit, the result of this being a first improvement in efficiency. Downstream of the first turbine (8), there is a second combustion chamber (9) in which the exhaust gases from the first turbine (8) are processed to produce hot gases for the second turbine (10) . The large calorific potential still present in the exhaust gases from this second turbine (10) flows through the exhaust heat boiler (11) in which a maximized steam power is produced, the result of which is the second improvement in efficiency.

5 Claims, 2 Drawing Sheets

COMBINED GAS/STEAM POWER STATION PLANT

This is a continuation of Ser. No. 07/889,352, filed May 28, 1992 (abandoned).

BACKGROUND OF THE INVENTION

1. Field of the Invention

The present invention concerns a combined gas/-steam power station plant as described in the preamble to claim 1.

2. Discussion of Background

The concept "combined gas/steam power station plant"—referred to below as combined power station for short—is always understood to mean the interaction of at least one gas turbine group with at least one steam turbine circuit, the exhaust gases from the operation of the gas turbine group being passed through an exhaust heat steam generator (=exhaust heat boiler) in which the residual heat potential of these exhaust gases is used to generate the steam necessary for admission to the steam turbine. This additional steam power leads to a higher plant thermal efficiency. These combined power stations therefore have a very good conversion efficiency which is of the order of value of some 50–55%. One possibility of significantly increasing the efficiency of this plant can be an increase in the hot gas temperature. This introduces other disadvantages which have a negative effect on the efficiency of the plant and the economy of the electricity produced, i.e. the specific costs of the plant. It should therefore be noted that the preparation of a hot gas with a temperature of more than 1400° C. inevitably involves an advance into a range in which the $NO_x$ emissions from this combustion increase abruptly, which, in turn, makes measures such as water or steam injection necessary. These measures substantially negate the efficiency improvement theoretically to be expected from the increase in temperature so that the associated gain in efficiency bears no relation to the expenditure required, quite apart from the fact that any increase in temperature involves expensive adaptations with respect to high quality materials and expensive arrangements for cooling, especially as regards the blading.

SUMMARY OF THE INVENTION

Accordingly, one object of this invention is to increase the plant efficiency in a combined gas/steam power station plant of the type mentioned at the beginning without increasing the temperature of the hot gases.

The essential advantage of the invention may be seen in the fact that with reduced specific plant costs, the efficiency of the combined power station according to the invention can be increased to approximately 60% for a mixture temperature of 1200° C. before the gas turbine. This is achieved, on the one hand, by supplementing the compressor with an intercooler which introduces an increase in the specific power. A consequence of this would be a significant reduction in the combined power station efficiency. This negative effect, however, is obviated by the circuit according to the invention because the heat from the intercooler is usefully employed in such a way that pressurized water is generated which is partially converted into steam in the evaporator. This steam is then introduced into the steam turbine at an appropriate position and participates to the extent of 2–4 points, depending on the pressure ratio, in the combined efficiency. On the other hand, an additional measure is undertaken which provides a further increase in efficiency; this involves heating the compressed air initially, as is usual, in a combustion chamber from approximately 300° C. to approximately 1350° C. before it is expanded in a high pressure turbine. In this process, the temperature is reduced from a mixed value of 1200° C. to approximately 1000° C. It is then reheated again to approximately 1400° C. in such a way that in the subsequent low pressure turbine, an average turbine inlet temperature of 1200° C. again appears. This has the effect that the combustion gases flowing to the exhaust heat boiler have a temperature of approximately 600° C. The efficiency of the combined plant can be maximized to the circumscribed extent by the interdependence of these two measures.

Advantageous and expedient further developments of the solution according to the invention are given in the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
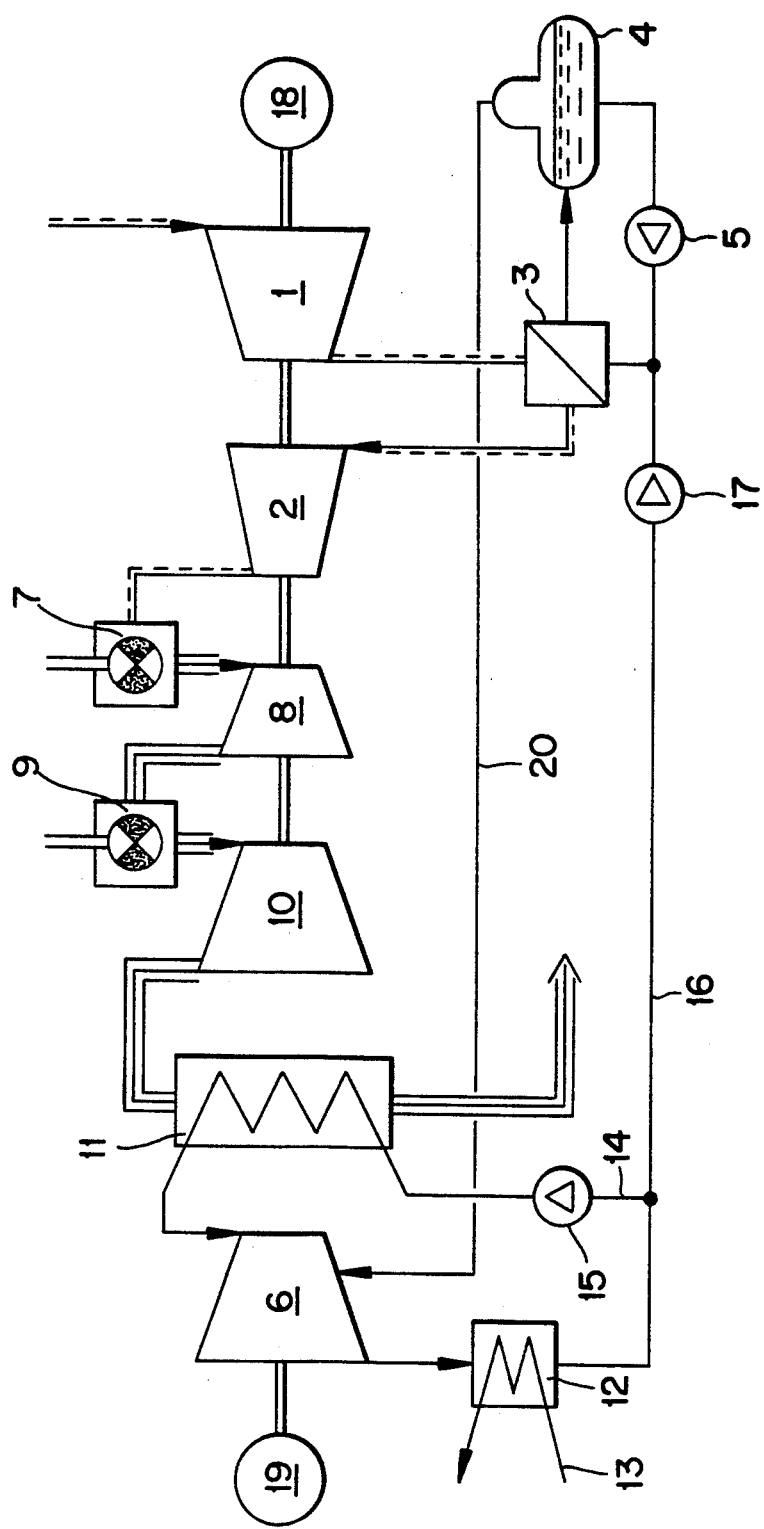
FIG. 1 shows a circuit diagram of a combined power station with reheat and intercooling and FIG. 2 shows a two-shaft coaxial arrangement of a gas turbine with reheat and intercooling.

Referring now to the drawings, wherein like reference numerals designate identical or corresponding parts throughout the several views, where the flow direction of the media is indicated by arrows and where all elements not directly necessary for understanding the invention are omitted, FIG. 1 shows a circuit diagram of a combined power station with intercooling and reheat. The compressor stage in this combined power station is subdivided into two partial compressors 1 and 2. Between these two compressors 1, 2, i.e. downstream of the first compressor 1 and upstream of the second compressor 2, there is an intercooler 3 in which the partially compressed air is intercooled. The hot water generated in this intercooler 3 from the intercooling process mentioned is supplied to a downstream evaporator 4, which can be single-stage or multi-stage. Evaporation occurs here and the steam 20 gained in this manner is supplied to a suitable position in the steam turbine 6, downstream of the gas turbine group. This steam initially participates in the combined efficiency to the extent of between 2 and 4 points, depending on the pressure ratio. The compressed air from the compressor 2 passes at, for example, 45 bar into a first hot gas generating plant 7, which is preferably a combustion chamber, in which the air is heated from approximately 350° C. to approximately 1350° C. hot gas temperature. This hot gas is then admitted to a high pressure turbine 8 in which the gas is expanded from 45 bar to approximately 14 bar. The temperature of the hot gas experiences a reduction from a mixed value of 1200° C. to approximately 850° C. in this high pressure turbine 8. The exhaust gases from this high pressure turbine 8 are then heated to approximately 1400° C. in a second hot gas generating plant 9, which is preferably a combustion chamber, in order to achieve by this means a weighted average turbine inlet temperature of 1200° C. also for a low pressure turbine 10 connected downstream of said second combustion chamber 9. Both the first combustion chamber 7 and the second combustion chamber 9 can be operated with a liquid and/or gaseous fuel. The cooling air flows for the two turbines 8 and 10 are each about 10–15% and are extracted at appropriate locations from the compressors 1, 2. This cannot be seen in FIG. 1. Expansion occurs in the low pressure turbine 10 with a pressure ratio of approximately 14 so that the exhaust gases flowing to an exhaust heat boiler 11 fitted downstream of the turbine last mentioned are at approximately 600° C. Steam is there generated in two pressure stages and is then supplied to the downstream steam turbine 6. It is also possible to use a three-pressure exhaust heat boiler. Downstream of this steam turbine 6, there is a condenser 12 in which water or air can be used as the cooling medium 13. The condensate of the exhaust steam from the steam turbine 6 is then divided into two partial flows. One partial flow 14 is fed by a supply pump 15 into the exhaust heat boiler 11; the other partial flow 16 flows via a further supply pump 17 through the intercooler 3 and the evaporator 4. In the intercooler 3, the air flowing from the compressor 1 is cooled down to 70° C. and the water is heated to approximately 180–200° C. in the process. The water is in turn cooled down in the evaporator 4 by the removal of the evaporation heat. The evaporator 4 can also be used as a de-aerator. The gas turbine group and the steam turbine drive one generator each 18, 19. The circuit last described with the second combustion chamber 9, downstream of the high pressure turbine 8 and upstream of the low pressure turbine 10, participates for its part in the combined efficiency to the extent of at least 5 points so that, on the basis of an efficiency yield of approximately 55% for a combined power station associated with the state of the art, and taking account of the improvement in efficiency from the introduction of the steam 20 gained in the evaporator 4 in the steam turbine 6, an efficiency of at least 60% will be obtained in the circuit described here.

With respect to the arrangement of such a circuit in accordance with FIG. 1, it is suggested that because of the large pressure ratio of about 45 or more, a two-shaft gas turbine should be employed because the variation in volume flow during the process is very large. In order, furthermore, to keep the compressor outlet temperature within bounds, the intercooling of the compression already described with respect to FIG. 1 is provided. The ideal arrangement with respect to fluid logistics is, of course, that with a so-called "core engine", as is proposed in FIG. 2. This involves the central introduction of a power-balanced gas turbine group with compressor, combustion chamber 7 and turbine 8.

Figure 2:
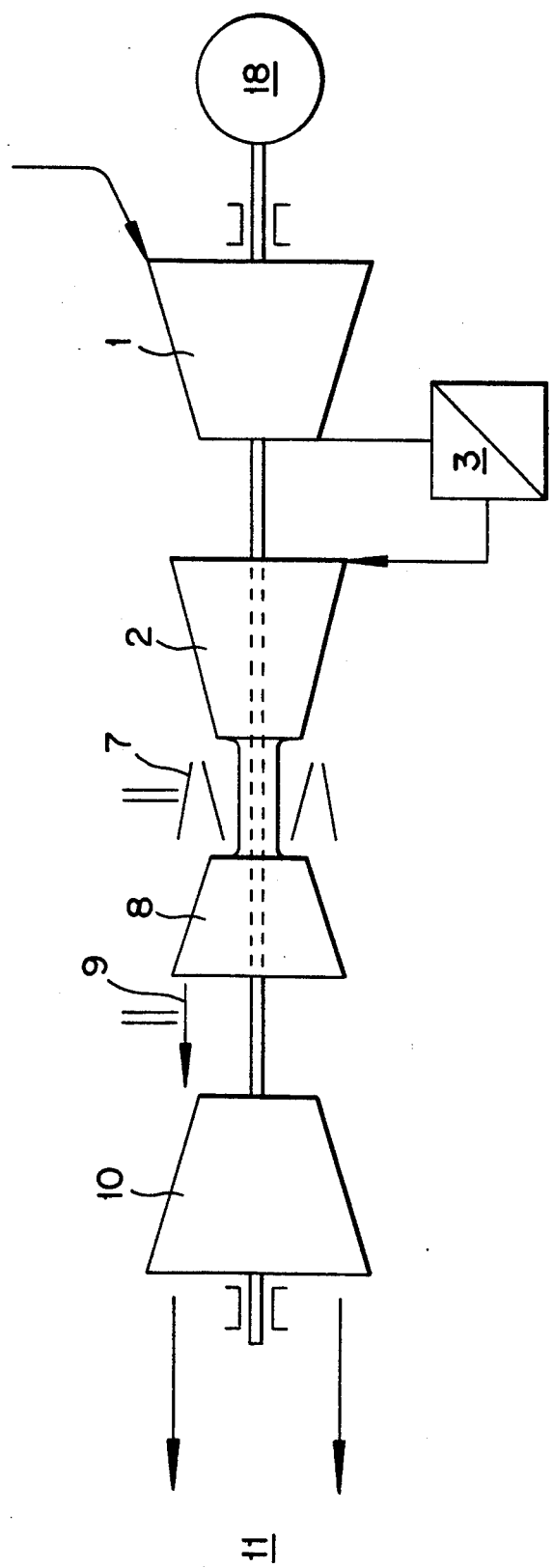

FIG. 2 fundamentally shows the same circuit for the gas turbine group as FIG. 1 in the same ideal arrangement with respect to fluid logistics. The main purpose of this two-shaft coaxial arrangement is to eliminate hot gas ducts downstream of the first combustion chamber 7 and downstream of the second combustion chamber 9. One possible solution is to design the combustion chambers as annular combustion chambers. What has been said applies, of course, to both combustion chambers, which can be constant volume combustion chambers instead of constant pressure combustion chambers, it being possible to use the individual cells of a cell wheel as the combustion space in the case of constant volume combustion chambers.

The introduction, as mentioned, of an intrinsically power-balanced gas turbine group with compressor 2, combustion chamber 7 and turbine 8 forms a unit whose speed is independent of the speed of the low pressure group (with compressor 1, combustion chamber 9 and turbine 10) and is, generally speaking, higher. The first group can certainly be referred to as a pressure increasing unit. The low pressure unit therefore forms the basic unit. Such a configuration is ideal for a modular system. The basic unit can also be designed for 50 Hz or 60 Hz with approximately the same mass flow so that the modular system can be extended to the maximum extent.

The provision of a single-shaft arrangement is not, of course, excluded for technical reasons. It should, however, be noted that in such an arrangement, 2–3 points of efficiency are sacrificed relative to an arrangement optimized in pressure ratio. A reduction in specific power of approximately 15% has to be accepted. On the other hand, there are operational advantages such as a simple control and safety system. The part-load behavior is not seriously penalized by the single-shaft design with respect to efficiency because very good part-load efficiency behavior is obtained by induction air preheating, possibly combined with adjustment of the compressor inlet guide vane row. It should also be noted that as a pure gas turbine, i.e. without a downstream steam turbine, reheating gives no advantage in terms of efficiency. On the contrary, a reduction has to be accepted. Intercooling with or without reheat does, however, improve the efficiency to the extent quoted above in the case of large pressure ratios. However, even with reheat alone, the specific power increases by some 20%, with reheat and intercooling it increases by as much as approximately two-thirds.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A combined gas/steam power station plant, comprising:
   a gas turbine group including a low pressure compressor driven by a low pressure turbine and a high pressure compressor driven by a high pressure turbine;
   the low pressure compressor being connected upstream of the high pressure compressor, the high pressure compressor being connected upstream of the high pressure turbine, and the high pressure turbine being connected upstream of the low pressure turbine;
   a first combustion chamber connected downstream of the high pressure compressor and upstream of the high pressure turbine for generating hot gas for driving the high pressure turbine;
   a second combustion chamber connected downstream of the high pressure turbine and upstream of the low pressure turbine for generating hot gas for driving the low pressure turbine;
   the low pressure compressor, low pressure turbine and second combustion chamber comprising a basic unit, and the high pressure compressor, high pressure turbine and first combustion chamber comprising a pressure increasing unit;

an exhaust heat boiler connected downstream of the low pressure turbine for generating steam from heat of the discharge of the low pressure turbine;

a steam turbine connected to the exhaust heat boiler for receiving steam from the boiler for driving the steam turbine;

an intercooler interposed between the low pressure compressor and the high pressure compressor for cooling compressed air before entry into the high pressure compressor; and, an evaporator connected to the intercooler for generating steam from heat removed from the compressed air, said evaporator connected to the steam turbine independently of the exhaust heat boiler for delivering steam for driving the steam turbine.

2. A combined gas/steam power station plant as claimed in claim 1, wherein the basic unit forms a two shaft design in combination with the pressure increasing unit.

3. A combined gas/steam power station plant as claimed in claim 1, wherein the combustion chambers are constant pressure plants.

4. The combined gas/steam power station plant as claimed in claim 1, further comprising means for operating the basic unit at one of 50 Hz and 60 Hz with approximately the same mass flow.

5. The combined gas/steam power station plant as claimed in claim 1, wherein the combustion chambers are pressure wave machine constant volume plants.

* * * * *